United States Patent
Reinhold et al.

(10) Patent No.: US 8,534,049 B2
(45) Date of Patent: Sep. 17, 2013

(54) PROCEDURE FOR OPERATING A METERING VALVE AND DEVICE FOR IMPLEMENTING THE PROCEDURE

(75) Inventors: Jens Reinhold, Backnang (DE); Marc Chaineux, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 816 days.

(21) Appl. No.: 12/431,426

(22) Filed: Apr. 28, 2009

(65) Prior Publication Data
US 2009/0282815 A1  Nov. 19, 2009

(30) Foreign Application Priority Data

May 15, 2008  (DE) .................. 10 2008 001 789

(51) Int. Cl.
*F01N 3/00*  (2006.01)
*F01N 3/10*  (2006.01)

(52) U.S. Cl.
USPC .................................. 60/286; 60/295; 60/303

(58) Field of Classification Search
USPC ..................... 60/273, 274, 277, 286, 295, 303
See application file for complete search history.

(56) References Cited

U.S. PATENT DOCUMENTS

| | | | | |
|---|---|---|---|---|
| 6,167,698 B1 * | 1/2001 | King et al. | .................. | 60/286 |
| 6,209,315 B1 * | 4/2001 | Weigl | .................. | 60/274 |
| 2008/0202104 A1 * | 8/2008 | Ichikawa | .................. | 60/295 |
| 2008/0264041 A1 * | 10/2008 | Gerlach | .................. | 60/286 |
| 2009/0159132 A1 * | 6/2009 | Gerlach | .................. | 137/2 |
| 2009/0199540 A1 * | 8/2009 | Kleinknecht | .................. | 60/274 |

FOREIGN PATENT DOCUMENTS

| | | |
|---|---|---|
| DE | 198 19579 C1 | 9/1999 |
| DE | 199 03 439 | 8/2000 |
| DE | 10 2006 044 080 | 3/2008 |
| DE | 10 2007 044 807 | 4/2009 |

* cited by examiner

*Primary Examiner* — Kenneth Bomberg
*Assistant Examiner* — Audrey K Bradley
(74) *Attorney, Agent, or Firm* — Merchant & Gould P.C.

(57) ABSTRACT

Procedure for operating an electromagnetically operated metering valve, which is impinged with a metering signal, which determines the metering of a reagent or a precursor of a reagent that has to be injected into the exhaust gas area of a combustion engine, is thereby characterized, in that the reagent pressure is detected at an opened metering valve in a default cycle, which indicates the reagent flow and in that the reagent flow is added over the opening time of the valve for determining the actual metering amount.

5 Claims, 1 Drawing Sheet

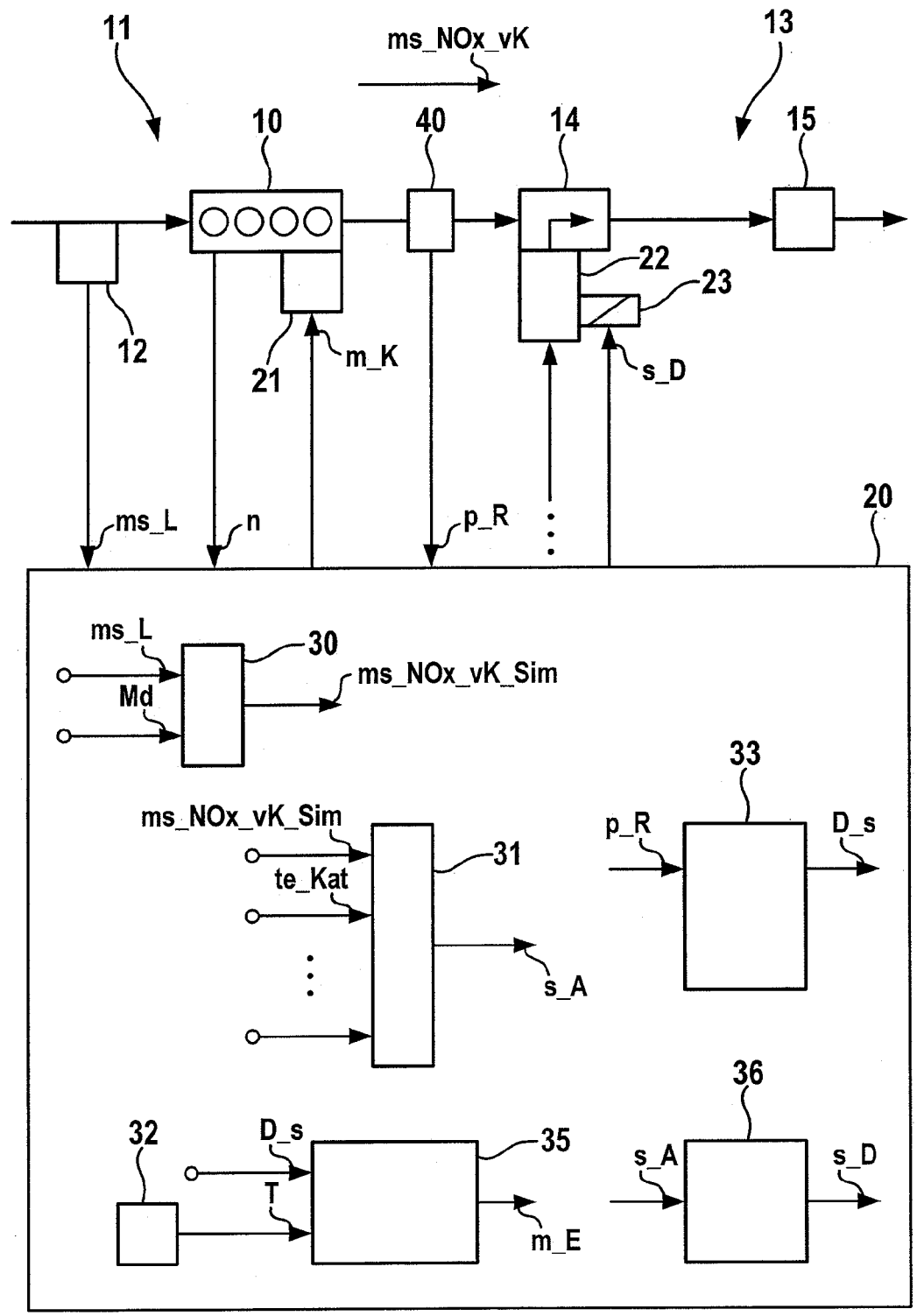

PROCEDURE FOR OPERATING A METERING VALVE AND DEVICE FOR IMPLEMENTING THE PROCEDURE

TECHNICAL FIELD

The invention concerns a procedure for operating a metering valve, which meters a reagent or a precursor of a reagent into the exhaust gas area of a combustion engine and a device for implementing the procedure according to the category of the independent claims.

Subject matter of the invention are also a computer program and a computer program product with a program code, which is saved on a machine readable medium for implementing the procedure.

BACKGROUND

A procedure and a device for operating a combustion engine are known from DE 199 03 439 A1, in whose exhaust gas area a SCR-catalyzer (selective catalytic reduction) is arranged, which reduces the nitrous gases that are contained in the exhaust gas of the combustion engine with a reagent to nitrogen.

The reagent ammoniac is for example used thereby as a reagent, which can be won from a urea-water-solution or a urea-formic-acid-water-solution as a precursor of the reagent. The metering of the reagent or of the precursor of the reagent has to take place very precisely. A metering that is too low causes that nitrous gases in the SCR-catalyzer cannot be sufficiently reduced anymore. A metering that is too high causes a so-called reagent slip, which can cause an unnecessary high reagent consumption on the one hand and, depending on the kind of the reagent, an unpleasant odor nuisance on the other hand.

A procedure for operating a reagent metering valve is known from DE 10 2006 044 080 A1, at which a reagent is metered by an electromagnetically controllable valve. The metering valve is impinged with a pulse-width modulated metering signal, which determines the metering of a precursor of a reagent that has to be introduced into the exhaust gas area of a combustion engine. The opening time of the metering valve is limited to a minimal opening time, at which the metering valve is completely opened.

The opening time is thereby determined in such a way that a fine spray mist is created. Thereby a crystallizing of the reagent is avoided. Hereby an exact metering is possible; moreover it is worked against a blocking of the metering valve. The minimal opening time depends on several parameters, as for example the temperature and the operating voltage of the metering valve magnet as well as on the reagent pressure.

DE 10 2007 044 807.6 describes a procedure for operating a metering valve and a device for implementing the procedure, at which the electromagnetically operated metering valve is impinged with a pulse-width modulated metering signal. Hereby a clock signal is provided whose cycle duration is shorter than the cycle duration of the pulse-width modulated metering signal. The cycle duration of the pulse-width modulated metering device is determined to multiple cycle durations of the clock signal depending on a metering demand signal.

The problem with this procedure is that in some cases the metered amount does not correspond exactly with the requirements, which means with the desired metering amount. Furthermore the metering amount does not only depend on the opening time of the valve, but is also determined by several other factors. The amount is mostly determined by the reagent pressure.

The invention is therefore based on the task to improve a procedure for operating an electromagnetically operated metering valve in such a way that a mostly precise metering of the reagent is enabled, whereby in particular influences of the reagent pressure are considered.

SUMMARY

This task is accomplished by a procedure for operating an electromagnetically operated metering valve with the characteristics of claim 1.

The basic idea of the invention to consider the dependency of the measured metering amount on the reagent pressure thereby that the flow rate through the metering valve is not determined anymore depending on the duty cycle of a pulse-width modulated signal, as it is described for example in DE 10 2007 044 807.6, but that the flow rate is determined at a completely opened valve depending on the reagent pressure. Therefore a characteristic line is determined, which represents the coherence between the stationary flow rate over the pressure. The flow rate that is won from this characteristic line is a maximum, which can be metered in a given time interval. This maximum that depends on the reagent pressure is put into relation to the desired amount, which means the desired injected amount. In order to detect pressure variations and such alike the reagent pressure is detected at an opened metering valve in a default cycle, this implies the reagent pressure and the reagent flow is summed up over the default opening time of the valve for determining the actual metering amount. In doing so a very precise metering amount is obtained.

Advantageous improvements and embodiments of the procedure according to the invention are subject matter of the dependent claims.

Thus it can be provided for example in a first embodiment to determine the opening time of the valve by a direct control of the valve over a time signal. According to another embodiment the opening time has to be determined by the pulse-width of a pulse-width modulated metering signal.

In each case the cycle, which means the duty cycle is selected in such a way that the cycle duration of the cycle signal is significantly smaller than the opening time of the valve or significantly smaller than the pulse duration of the pulse-width modulated metering signal.

The device according to the invention for implementing the procedure concerns at first a control unit, which is customized for implementing the procedure. The control unit contains in particular means, which are suitable for implementing the procedure. Thus a memory is for example provided, in which the characteristic line, which represents the coherence of the reagent pressure and the flow rate amount at an opened valve, is stored. Furthermore the control unit contains a cycle generator for provided the cycle signal and for the case that the metering valve is impinged with a pulse-width modulated metering signal, also a cycle generator for providing the metering signal.

The control unit provides furthermore a memory, in which the steps of the procedure are stored as a computer program.

The control unit according to the invention enables the process of all steps of the procedure of the invention, if it runs on the control unit.

The control program product with a program code that is stored on a machine readable medium, which implements the procedure according to the invention, if the program is carried out on a control unit.

Further advantageous improvement and embodiments of the procedure according to the invention arise from the following description,

BRIEF DESCRIPTION OF THE DRAWING

One embodiment of the invention is shown in the drawing and explained in the subsequent description.

FIG. 1 shows schematically a technical field, in which the procedure according to the invention is running.

DETAILED DESCRIPTION

The FIGURE shows a combustion engine 10, in whose exhaust gas 11 an air sensor 12 and in whose exhaust gas area 13 a metering device 14 as well as a catalyzer 15 are arranged. Upstream before the catalyzer 15 a NOx mass flow ms_NOx_vK occurs.

The air sensor 12 provides the control unit 20 with an air signal ms_L, the combustion engine 10 provides the control unit 20 with an engine speed n. the control unit 20 provides a fuel metering device 21 a fuel signal m_K.

The metering device 14 is assigned to a metering valve 22, which is operated by an electromagnet 23. The electromagnet 23 is impinged with a metering signal s_D, which is emitted by the control unit 20. In the control unit 20 a NOx mass flow determination 30 takes place, which is provided with the air signal ms_L as well as a measure Md for the load of the combustion engine 10 and which provides a calculated NOx mass flow ms_NOx_vK_Sim.

The control unit 20 contains furthermore a metering demand signal determination 31, which is provided with the calculated NOx mass flow ms_NOx_vK_Sim, the temperature te_Kat as well as further not labeled input parameters and which determines and provides a metering demand signal s_A.

The control unit 20 contains furthermore a cycle generator 32, which provided a cycle signal T.

A pressure sensor 40 is arranged in the exhaust gas area 13, whose output signal p_R is provided to the control unit 20. In the control unit 20 the stationary flow rate D_s is determined from this reagent pressure signal p_R in a rate flow determination 33. This stationary flow rate D_s is for example taken form a characteristic line, which has been determined before and which represents the coherence between the reagent pressure p_R and the stationary flow rate D_s at an opened valve 22.

The flow rate D_s can be also determined by different means, as for example arithmetically. The signal D_s that represents the stationary flow rate at an opened valve is given to an arithmetic unit 35, in which is summed up in the cycle of the data signal that has been provided by the cycle generator 32. The summation takes thereby place over the opening time of the valve 22, which is determined in an arithmetical device 36 depending on the metering demand signal s_A. the result of this summation is a signal of the injected amount m_E of the reagent.

In other words, the basic idea of the invention is therefore to add all discrete amounts that occur in one cycle and that occur per arithmetic step and pressure, and to determine thereby the actual totally injected metering amount. If the metering does not last for the entire time during this cycle the corresponding amount is only considered partially. The thereby calculated metering amount m_E is significantly more precise for bigger amount than the metering device that has been determined by the known procedure, thus the pre-controlled amount.

A further significant advantage is that a variation of the actual metering amount m_E from the desired amount s_A can already be determined before the end of the injection cycle by the summation and also that it can be determined in so far, whether the cycle has to be extended or shortened, whereby a cycle always means the time of the injection of the reagent.

The opening of the valve 22 can take place by a direct controlling of the valve 22. In that case the opening time of the valve 22 is determined by a direct controlling of the valve 22.

In the case of a pulse-width modulated controlling of the valve 22, as it is described for example in DE 10 2007 044 807.6, and which is referred to here, it can also be provided that the opening time is determined by the pulse duration of the pulse-width modulated signal.

The cycle duration of the cycle signal is selected free. It is definitely selected in such a way that it is shorter than the opening time of the valve 22 or shorter than the pulse duration of the pulse-width modulated metering signal.

Furthermore it can be provided that the cycle duration is a multiple of the basic cycle. In that case a new cycle is started after the cycle ended, whereby the remaining amount that has been determined in the integrator 35 is deducted from the new metering desire before calculating the opening time. Because this amount remains from the last metering, it does not have to be metered again. Due to the integrator 35 the timely takeover of a new metering desire can be adjusted to the actual metering on the one hand and the new desired amount can be modified in such a way that it considers the rest on the not yet metered reagent amount on the other hand.

The invention claimed is:

1. A device comprising at least one control unit with computer-executable instructions stored thereon, the computer-executable instructions for operating an electromagnetically operated metering valve that is impinged with a metering signal, wherein the metering signal determines the metering of a reagent or a precursor of a reagent that is to be injected into an exhaust gas area of a combustion engine, wherein the computer-executable instructions cause the control unit that executes the instructions to: open the metering valve to meter reagent into the exhaust gas area; detect the reagent pressure at an opened metering valve that indicates a reagent flow, wherein the detection occurs at time intervals during a default cycle via a summation; add the reagent flow over the opening time of the valve for determining an actual metering amount; determine the opening time of the valve by a direct controlling of the valve by a time signal; and select the default cycle such that a cycle duration of a cycle signal is shorter than the opening time of the valve.

2. The device of claim 1, wherein the at least one control unit comprises:
 a cycle generator for providing a cycle signal;
 a storage unit for storing a functional coherence of a stationary flow rate and the reagent pressure; and
 an arithmetic unit for determining the stationary flow rate at a measured pressure.

3. A method of operating an electromagnetically operated metering valve that is impinged with a metering signal, wherein the metering signal determines the metering of a reagent or a precursor of a reagent that is to be injected into an exhaust gas area of a combustion engine, the method comprising:
 opening the metering valve to meter reagent into the exhaust gas area;

detecting the reagent pressure at an opened metering valve that indicates a reagent flow, wherein the detection occurs at time intervals during a default cycle via a summation;

adding the reagent flow over the opening time of the valve for determining an actual metering amount;

determining the opening time of the valve by a pulse-width of a pulse-width modulated metering signal; and selecting the default cycle such that a cycle duration of a cycle signal is shorter than the pulse-width of the pulse-width modulated metering signal.

4. A control program product with a program code that is stored on a non-transitory machine readable medium and executed on a control unit for operating an electromagnetically operated metering valve that is impinged with a metering signal, wherein the metering signal determines the metering of a reagent or a precursor of a reagent that is to be injected into an exhaust gas area of a combustion engine, the program code including instructions for:

opening the metering valve to meter reagent into the exhaust gas area;

detecting the reagent pressure at an opened metering valve that indicates a reagent flow, wherein the detection occurs at time intervals during a default cycle via a summation;

adding the reagent flow over the opening time of the valve for determining an actual metering amount;

determining the opening time of the valve by a pulse-width of a pulse-width modulated metering signal; and selecting the default cycle such that a cycle duration of a cycle signal is shorter than the pulse-width of the pulse-width modulated metering signal.

5. A computer-implemented method for operating an electromagnetically operated metering valve that is impinged with a metering signal, wherein the metering signal determines the metering of a reagent or a precursor of a reagent that is to be injected into an exhaust gas area of a combustion engine, the computer-implemented method comprising:

opening the metering valve to meter reagent into the exhaust gas area;

detecting the reagent pressure at an opened metering valve that indicates a reagent flow, wherein the detection occurs at time intervals during a default cycle via a summation;

adding the reagent flow over the opening time of the valve for determining an actual metering amount;

determining the opening time of the valve by a pulse-width of a pulse-width modulated metering signal; and selecting the default cycle such that a cycle duration of a cycle signal is shorter than the pulse-width of the pulse-width modulated metering signal.

* * * * *